(12) United States Patent
Dornbusch et al.

(10) Patent No.: US 10,463,979 B2
(45) Date of Patent: *Nov. 5, 2019

(54) ADAPTER FOR ATTACHMENT TO A GAME CONTROLLER

(71) Applicant: COLLECTIVE MINDS GAMING CO. LTD., Maple Ridge (CA)

(72) Inventors: Ken Dornbusch, Maple Ridge (CA); Darren Ali, Maple Ridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/688,487

(22) Filed: Aug. 28, 2017

(65) Prior Publication Data

US 2017/0354895 A1 Dec. 14, 2017

Related U.S. Application Data

(63) Continuation-in-part of application No. 15/176,959, filed on Jun. 8, 2016, now Pat. No. 10,252,173.

(Continued)

(30) Foreign Application Priority Data

Jun. 8, 2017 (CA) ........................................ 2969968

(51) Int. Cl.
*A63F 13/24* (2014.01)
*A63F 13/98* (2014.01)
(Continued)

(52) U.S. Cl.
CPC .............. *A63F 13/98* (2014.09); *A63F 13/23* (2014.09); *A63F 13/24* (2014.09); *A63F 13/30* (2014.09);
(Continued)

(58) Field of Classification Search
CPC .. A63F 2300/1043; A63F 13/24; A63F 13/02; A63F 13/06; A63F 13/98;
(Continued)

(56) References Cited

U.S. PATENT DOCUMENTS

| 4,552,360 A | 11/1985 | Bromley et al. |
| 5,531,443 A | 7/1996 | Cruz |

(Continued)

FOREIGN PATENT DOCUMENTS

| CA | 142555 | 4/2013 |
| CA | 2747151 | 11/2015 |

(Continued)

OTHER PUBLICATIONS

"Review: Scuf Xbox 360 Controller" by Dave Burns, published Oct. 20, 2010. http://www.xboxer360.com/features/review-scuf-xbox-360-controller/ Oct. 22, 2010.

*Primary Examiner* — Justin L Myhr
(74) *Attorney, Agent, or Firm* — Bennett Jones LLP

(57) ABSTRACT

An adapter for use with a video game controller of a video game console includes a housing for attachment to the controller, a pair of lever switch mechanisms for operation by the left and right hand, and a console port. Each lever switch mechanism includes a contact switch and a lever. The contact switch is actuable between an open state and a closed state. The lever has a finger-engaging surface and an actuator portion. The lever is pivotable relative to the housing in response to a manual force applied to the finger-engaging surface, whereupon the actuator portion moves to actuate the contact switch between the open state and the closed state. The console port is operatively connected to the contact switch, and adapted to communicate electronic signals controlled by the contact switch to the game console to actuate a game function.

23 Claims, 14 Drawing Sheets

Related U.S. Application Data

(60) Provisional application No. 62/172,894, filed on Jun. 9, 2015.

(51) Int. Cl.
  *G07F 17/32* (2006.01)
  *A63F 13/30* (2014.01)
  *A63F 13/23* (2014.01)

(52) U.S. Cl.
  CPC ...... *G07F 17/3209* (2013.01); *G07F 17/3225* (2013.01); *A63F 2300/1025* (2013.01)

(58) Field of Classification Search
  CPC .. A63F 13/92; A63F 2300/1025; A63F 13/23; A63F 13/40; A63F 13/08; G05G 2009/0474; G05G 9/047
  See application file for complete search history.

(56) References Cited

U.S. PATENT DOCUMENTS

| | | | |
|---|---|---|---|
| 5,551,693 A | 9/1996 | Goto et al. | |
| D376,826 S | 12/1996 | Ashida | |
| D377,198 S | 1/1997 | Oikawa | |
| D384,112 S | 9/1997 | Riley et al. | |
| 5,670,988 A | 9/1997 | Tickle | |
| 5,716,274 A | 2/1998 | Goto et al. | |
| D393,291 S | 4/1998 | Kung | |
| 5,759,100 A | 6/1998 | Nakanishi | |
| 5,853,326 A | 12/1998 | Goto et al. | |
| 5,874,906 A | 2/1999 | Willner et al. | |
| 5,883,690 A | 3/1999 | Meyers | |
| D409,183 S | 5/1999 | Chen | |
| 5,923,317 A | 7/1999 | Sayler et al. | |
| D416,247 S | 11/1999 | Flender et al. | |
| 5,984,548 A | 11/1999 | Willner et al. | |
| 5,984,785 A | 11/1999 | Takeda et al. | |
| 6,001,014 A | 12/1999 | Ogata et al. | |
| 6,019,680 A | 2/2000 | Cheng | |
| 6,102,803 A | 8/2000 | Takeda et al. | |
| D431,604 S | 10/2000 | Chan | |
| 6,135,886 A | 10/2000 | Armstrong | |
| 6,171,191 B1 | 1/2001 | Ogata et al. | |
| 6,186,896 B1 | 2/2001 | Takeda et al. | |
| 6,210,278 B1 | 4/2001 | Klitsner | |
| 6,225,975 B1 | 5/2001 | Furuki et al. | |
| 6,231,444 B1 | 5/2001 | Goto et al. | |
| 6,241,611 B1 | 6/2001 | Takeda et al. | |
| 6,261,180 B1 | 7/2001 | Lebensfeld et al. | |
| 6,267,673 B1 | 7/2001 | Miyamoto et al. | |
| 6,279,906 B1 | 8/2001 | Sanderson et al. | |
| 6,280,327 B1 | 8/2001 | Leifer et al. | |
| 6,342,009 B1 | 1/2002 | Soma | |
| D469,436 S | 1/2003 | Hussaini et al. | |
| D471,552 S | 3/2003 | Loughnane et al. | |
| 6,572,108 B1 | 6/2003 | Bristow | |
| 6,743,100 B1 | 6/2004 | Neiser | |
| 6,811,491 B1 * | 11/2004 | Levenberg | A63F 13/02 |
| | | | 273/148 B |
| D545,317 S | 6/2007 | Wang et al. | |
| D585,931 S | 2/2009 | Palmer | |
| D610,625 S | 2/2010 | Guinchard et al. | |
| 7,762,553 B2 | 7/2010 | Harris | |
| D620,939 S | 8/2010 | Suetake et al. | |
| D624,080 S | 9/2010 | Jennings et al. | |
| D632,340 S | 2/2011 | Guinchard et al. | |
| D638,017 S | 5/2011 | Ortiz | |
| D667,892 S | 9/2012 | Burgess et al. | |
| D685,434 S | 7/2013 | Ali et al. | |
| 8,576,199 B1 | 11/2013 | Pryor | |
| 8,641,525 B2 | 2/2014 | Burgess et al. | |
| D706,874 S | 6/2014 | Ngoy | |
| 8,753,206 B2 | 6/2014 | Ali et al. | |
| D708,675 S | 7/2014 | Delrue | |
| D721,139 S | 1/2015 | Burgess et al. | |
| D733,802 S | 7/2015 | Burgess | |
| D736,322 S | 8/2015 | Navid | |
| D748,734 S | 2/2016 | Burgess et al. | |
| D752,150 S | 3/2016 | Young | |
| D752,688 S | 3/2016 | Jensen | |
| D777,260 S | 1/2017 | Burgess | |
| D778,989 S | 2/2017 | Ali | |
| D810,831 S | 2/2018 | Ali | |
| D819,140 S | 5/2018 | Ali et al. | |
| 2001/0012801 A1 | 8/2001 | Komata | |
| 2003/0003993 A1 * | 1/2003 | Leifer | A63F 13/06 |
| | | | 463/39 |
| 2004/0023719 A1 * | 2/2004 | Hussaini | A63F 13/06 |
| | | | 463/37 |
| 2004/0180720 A1 * | 9/2004 | Nashi | A63F 13/06 |
| | | | 463/37 |
| 2004/0224768 A1 * | 11/2004 | Hussaini | A63F 13/24 |
| | | | 463/37 |
| 2007/0072680 A1 * | 3/2007 | Ikeda | A63F 13/06 |
| | | | 463/43 |
| 2009/0088250 A1 * | 4/2009 | Carlson | A63F 13/06 |
| | | | 463/37 |
| 2009/0233671 A1 | 9/2009 | Tsukahara | |
| 2010/0267454 A1 * | 10/2010 | Navid | A63F 13/24 |
| | | | 463/37 |
| 2012/0244944 A1 * | 9/2012 | Kotkin | A63F 13/98 |
| | | | 463/38 |
| 2012/0302348 A1 | 11/2012 | Karacal et al. | |
| 2013/0077675 A1 | 3/2013 | Rosen et al. | |
| 2014/0113723 A1 | 4/2014 | Burgess et al. | |
| 2015/0363007 A1 * | 12/2015 | Lysenko | G06F 1/1671 |
| | | | 345/169 |
| 2016/0151706 A1 * | 6/2016 | Antonio | A63F 13/24 |
| | | | 463/37 |
| 2016/0317918 A1 * | 11/2016 | Gassoway | A63F 13/24 |
| 2016/0361639 A1 * | 12/2016 | Schmitz | A63F 13/24 |
| 2017/0001109 A1 | 1/2017 | Dornbusch et al. | |
| 2017/0354895 A1 | 12/2017 | Dornbusch | |

FOREIGN PATENT DOCUMENTS

| | | |
|---|---|---|
| CA | 162784 | 11/2016 |
| CA | 2932358 | 12/2016 |
| CA | 2969968 | 12/2017 |
| CA | 169939 S | 11/2018 |
| CA | 2977382 | 12/2018 |
| GB | 2481633 | 1/2012 |

\* cited by examiner

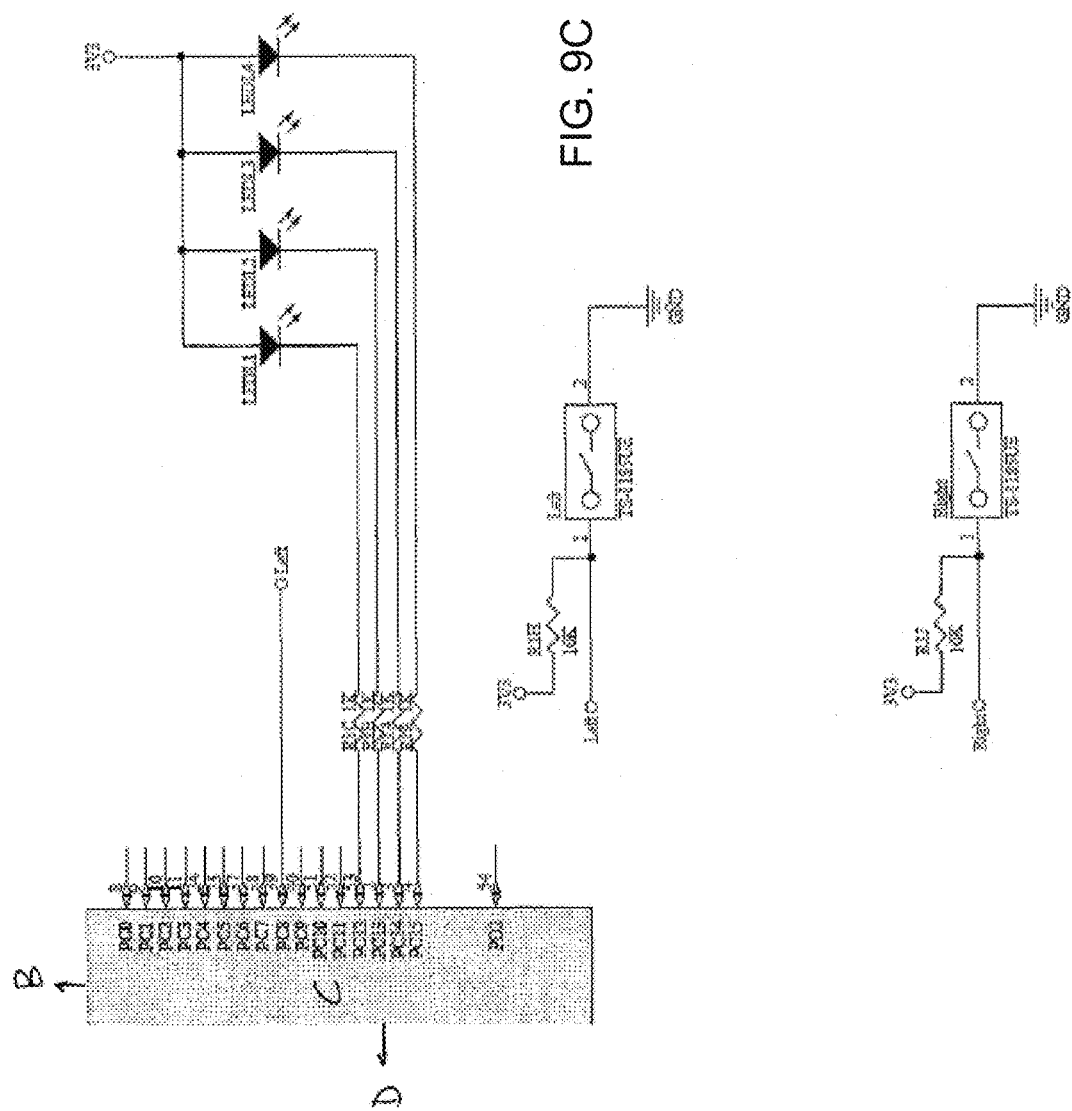

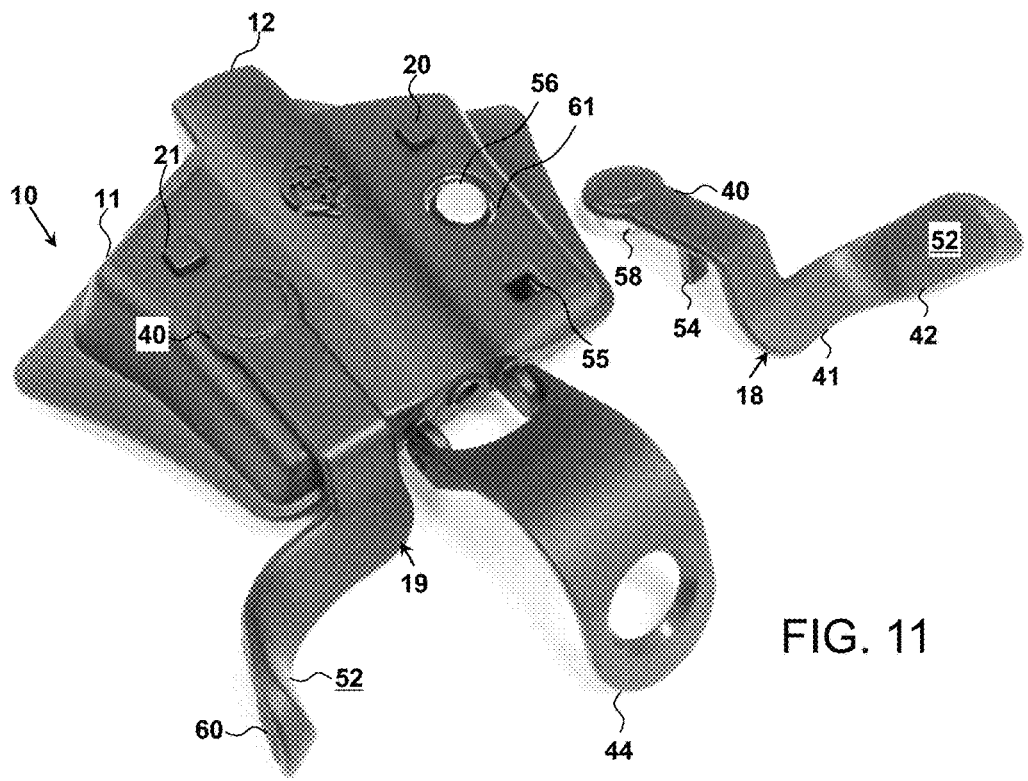
FIG. 11
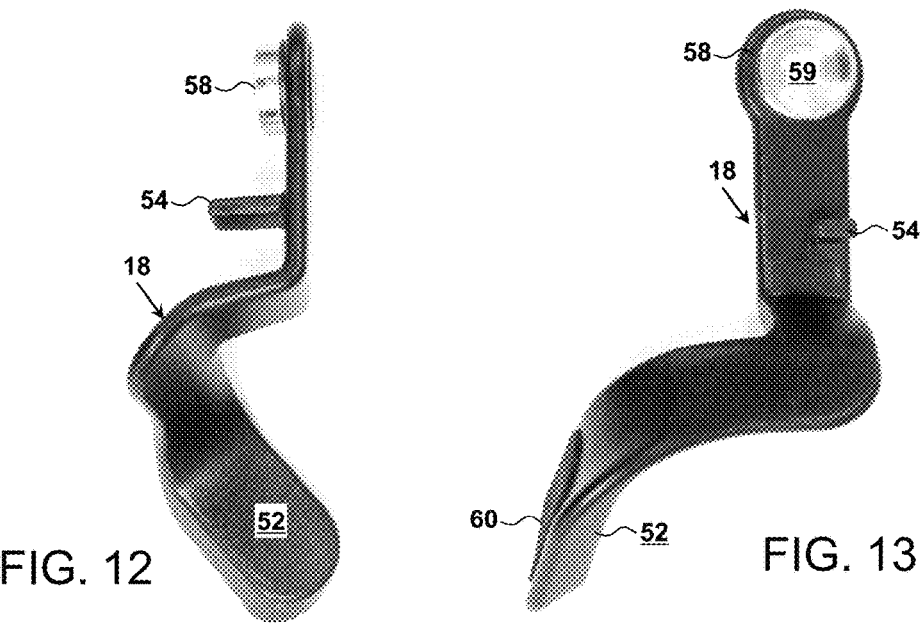
FIG. 12
FIG. 13

ADAPTER FOR ATTACHMENT TO A GAME CONTROLLER

RELATED APPLICATIONS

This application is a continuation-in-part of U.S. patent application Ser. No. 15/176,959 filed on Jun. 8, 2016, which claims priority to U.S. provisional patent application 62/172,894 filed on Jun. 9, 2015.

FIELD OF THE INVENTION

The present invention relates to an apparatus which attaches to a game controller, and provides game control functionality.

BACKGROUND

Conventional video game play on consoles is controlled by controllers designed to be held in one or both hands of the game player, and which provide buttons, triggers, toggles, switches, touch sensors and other input mechanisms which control or actuate game functions.

Game controllers are typically proprietary to the manufacturer of the game console but share a common form factor. They are generally shaped to fit in both hands of a player, such that controls on the top surface are accessible with the thumb, while controls on the front or side are accessible with the index fingers. It is known to place a control paddle on the underside of the controller, which would allow the player's other fingers, such as the middle fingers, to be used. However, these underside control levers require permanent modification of a game controller, or a complete custom manufacture. As a result, the manufacturer's warranty is typically voided.

SUMMARY OF THE INVENTION

In one aspect, the invention may comprise an adapter for use with a video game controller. The adapter comprises a housing for attachment to the controller, at least one lever switch mechanism, and a console port. Each lever switch mechanism comprises a contact switch, and a lever. The contact switch is actuable between an open state and a closed state. The lever comprises a finger-engaging surface and an actuator portion. The lever is pivotable relative to the housing in response to a manual force applied to the finger-engaging surface, whereupon the actuator portion moves to actuate the contact switch between the open state and the closed state. The console port is operatively connected to the contact switch, and adapted to communicate electronic signals controlled by the contact switch to the game console to actuate a game function.

In one embodiment of the adapter of the adapter, the lever pivots relative to the housing about a substantially vertical axis, when the housing is attached to the controller.

In one embodiment of the adapter, the at least one lever switch mechanism comprises a left lever switch mechanism, and a right lever switch mechanism. The adapter may further comprise a left programming button, a right programming button, a controller port, and a function control module. The controller port is adapted to interface with the controller to receive a game function from the controller. The function control module is operatively connected to the left programming button, the right programming button, and the controller port. The function control module is configured to be programmable to assign the game function to either: the left lever switch, in response to receiving an input created by depressing the left programming button when the game function is received from the controller; or the right lever switch, in response to receiving an input created by depressing the right programming button when the game function is received from the controller.

In one embodiment of the adapter, the finger-engaging surface of the lever extends rearward from the housing.

In one embodiment of the adapter, the finger-engaging surface of the lever is oriented vertically, when the housing is attached to the controller.

In one embodiment of the adapter, the controller comprises a hand grip comprising a finger-contacting surface, wherein the finger-engaging surface of the lever is disposed immediately adjacent the finger-contacting surface of the hand grip, when the housing is attached to the controller. In one embodiment of the adapter, the finger-engaging surface of the lever and the finger-contacting surface of the hand grip extend substantially parallel to each other in their respective elongate directions, when the housing is attached to the controller.

In one embodiment of the adapter, the contact switch is biased toward a normal state being either the open state or the closed state.

In one embodiment of the adapter, the contact switch is disposed inside the housing, and the actuator portion of the lever passes from outside the housing to inside the housing via an aperture defined by the housing, to engage the contact switch.

In one embodiment of the adapter, the adapter further comprises a first ferromagnetic member attached to the housing, and a second ferromagnetic member attached to the lever. At least one of the first and second ferromagnetic members comprises a permanent magnet. The lever is removably attached to the housing by magnetic attraction between the first and second ferromagnetic members. In one embodiment of the adapter, either one of the first and second ferromagnetic members defines a cylindrical disc, and the other one of the first and second ferromagnetic members defines a cylindrical recess. The recess is sized to receive the disc and permit rotation of the disc relative to the recess when the lever pivots relative to the housing, while preventing translation of the disc relative to the recess. In one embodiment of the adapter, the first ferromagnetic member is disposed inside the housing, and the second ferromagnetic member passes from outside the housing to inside the housing via an aperture defined by the housing, to contact the first ferromagnetic member.

In one embodiment of the adapter, the lever switch mechanism further comprises a resilient pad attached to the lever. The pad is positioned on the lever so as to be compressed between the lever and the controller when the housing is attached to the controller and the lever pivots relative to the housing.

In another aspect, the present invention comprises a device for use with a video game controller adapter comprising a housing for attachment to the game controller, a contact switch actuable between an open state and a closed state, and a first ferromagnetic member attached to the housing. The device comprises a lever comprising a finger-engaging surface and an actuator portion. The device also comprises a second ferromagnetic member attached to the lever. At least one of the first and second ferromagnetic members comprises a permanent magnet. The lever is removably attachable to the housing by magnetic attraction between the first and second ferromagnetic members. The actuator portion is positioned to move and thereby actuate the contact switch between the open state and the closed state, when the lever is attached to the housing and pivoted relative to the housing in response to a manual force applied to the finger-engaging surface.

In one embodiment of the device, either one of the first and second ferromagnetic members defines a cylindrical disc, and the other one of the first and second ferromagnetic members defines a cylindrical recess. The recess is sized to receive the disc and permit rotation of the disc relative to the recess when the lever pivots relative to the housing, while preventing translation of the disc relative to the recess.

In one embodiment of the device, the lever pivots relative to the housing about a substantially vertical axis, when the lever is attached to the housing, and the housing is attached to the controller.

In one embodiment of the device, the finger-engaging surface of the lever extends rearward from the housing, when the lever is attached to the housing, and the housing is attached to the controller.

In one embodiment of the device, the finger-engaging surface of the lever is oriented vertically, when the lever is attached to the housing, and the housing is attached to the controller.

In one embodiment of the device, the device further comprises a resilient pad attached to the lever, wherein the pad is positioned on the lever so as to be compressed between the lever and the controller when the housing is attached to the controller, the lever is attached to the housing, and the lever pivots relative to the housing.

BRIEF DESCRIPTION OF THE DRAWINGS

The following drawings form part of the specification and are included to further demonstrate certain embodiments or various aspects of the invention. In some instances, embodiments of the invention can be best understood by referring to the accompanying drawings in combination with the detailed description presented herein. The description and accompanying drawings may highlight a certain specific example, or a certain aspect of the invention. However, one skilled in the art will understand that portions of the example or aspect may be used in combination with other examples or aspects of the invention.

FIGS. 9A-D together shows a schematic diagram of one embodiment of a function control module.

FIG. 11 shows a bottom-rear perspective view of the adapter shown in FIG. 10A, separate from the controller, with one of the levers removed.

FIG. 12 shows a side view of the removed lever shown in FIG. 11.

FIG. 13 shows a top view of the removed lever shown in FIG. 11.

DETAILED DESCRIPTION

As used herein, the recited terms have the following meanings. All other terms and phrases used in this specification have their ordinary meanings as one of skill in the art would understand.

Generally, the present invention comprises a video game controller adapter (10) for use with a handheld video game controller (30). The adapter is configured to connect to both the controller (30) and the game console (100) so as to pass through conventional game command functions to the game console, and comprises at least one game actuator mechanism which can either replicate an existing game function or provides a custom game function to be added to the controller. The at least one game actuator mechanism may be programmable so that the user may select or create the game control provided by the adapter. This additional functionality may thus be added to controller (30) without permanently modifying the controller itself. In one embodiment, the adapter is configured to fit into and be secured within the battery compartment of an existing controller. In alternative embodiments, the adapter is configured to attach to the exterior of an existing controller. In either case, no permanent modification is made. In other words, the controller case is not opened or cut, and the internal components of the controller are not modified or connected to. Upon removal of the adapter, the controller is exactly as it was before.

Figure 1:
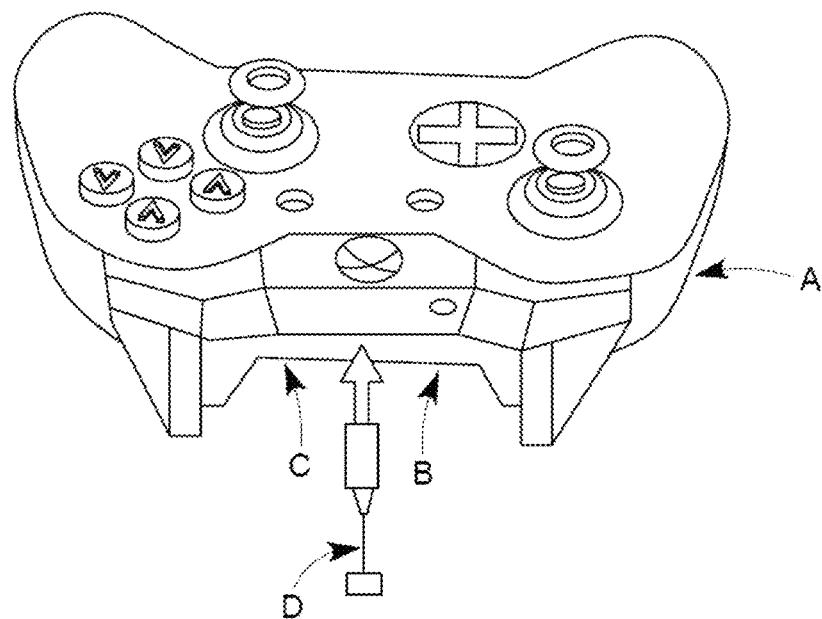
FIG. 1 shows a prior art conventional controller for an Xbox™ video game console.
Figure 2:
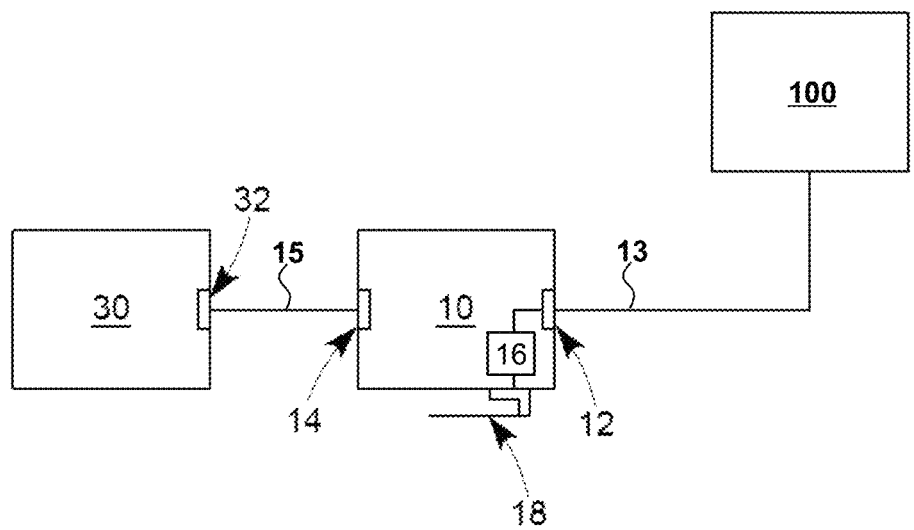
FIG. 2 is a schematic block diagram showing one embodiment of an adapter of the present invention connected to a video game console and a controller.

A conventional Xbox One™ controller (A) is shown in FIG. 1. As may be seen, a removable battery (B) pack is held within a battery compartment (C) on the underside of the controller. An Xbox One controller may be used wirelessly, so that the battery is the power source, or the controller may be connected by a cable (D) to the game console (not shown), which cable transmits game command information from the controller to the game console and also provides power to the controller from the game console, in which case the battery is not necessary.

The adapter (10) of the present invention may be used with a controller (30) having an accessible compartment such as a battery compartment, and a connection port (32) for physically connecting to a game console (100), the adapter comprising:
  (a) a housing (11) having a shape configured to be securely placed in the compartment;
  (b) a console port (12) adapted to connect a cable (13) to a game console for transmitting game information and actions to the game console and to receive power from the game console;
  (c) a controller port (14) for connecting a cable (15) to the controller connection port (32); and
  (d) a function control module (16) operatively connected to at least one game function lever (18).
wherein the control module (16) is operatively connected to the console port (12) to transmit adapter game functions to the game console. Game function commands from the controller (30) itself may pass through the adapter unaltered, and are sent to the game console (100) via port (12).

In alternative embodiments, the console port which provides a connection to the game console may comprise a wireless configuration, such as a Bluetooth™ module or a module implementing any other short range wireless protocol.

Figure 3:
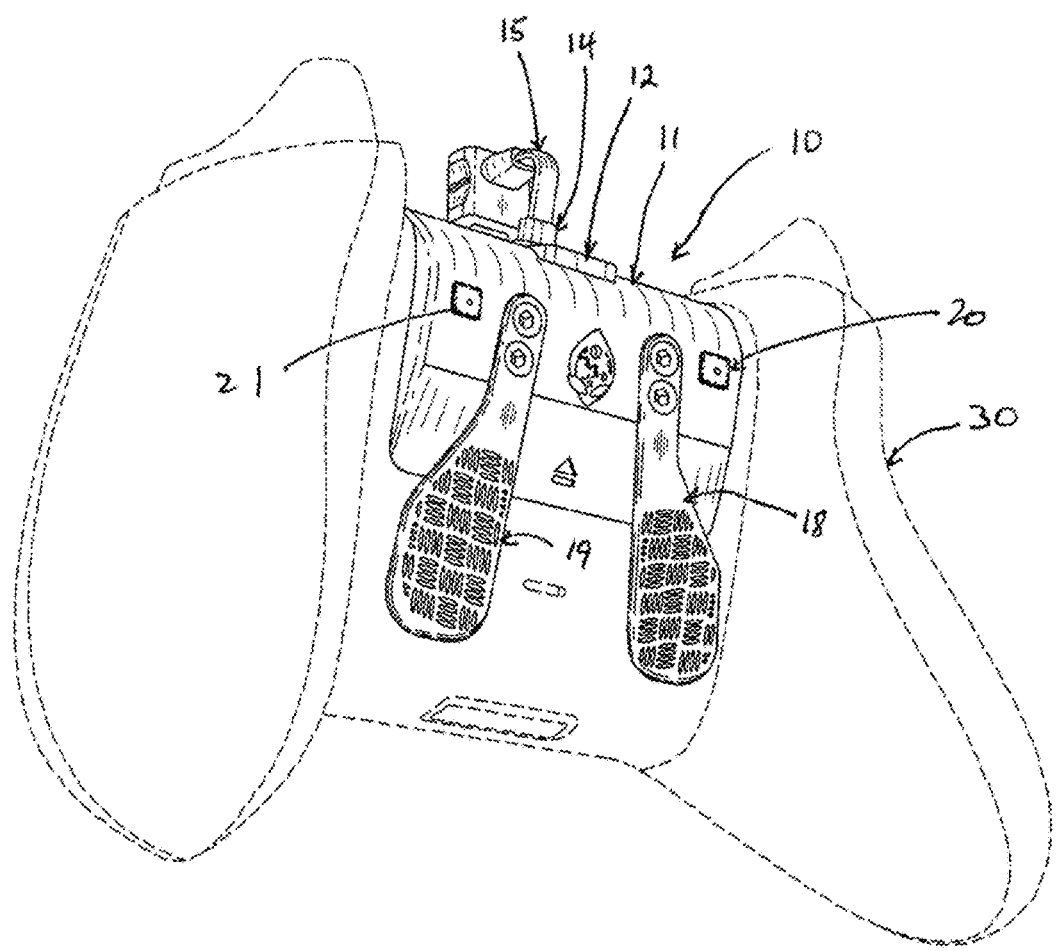
FIG. 3 is a view of one embodiment of an adapter, installed into the battery compartment of the controller shown in FIG. 1.
Figure 4:
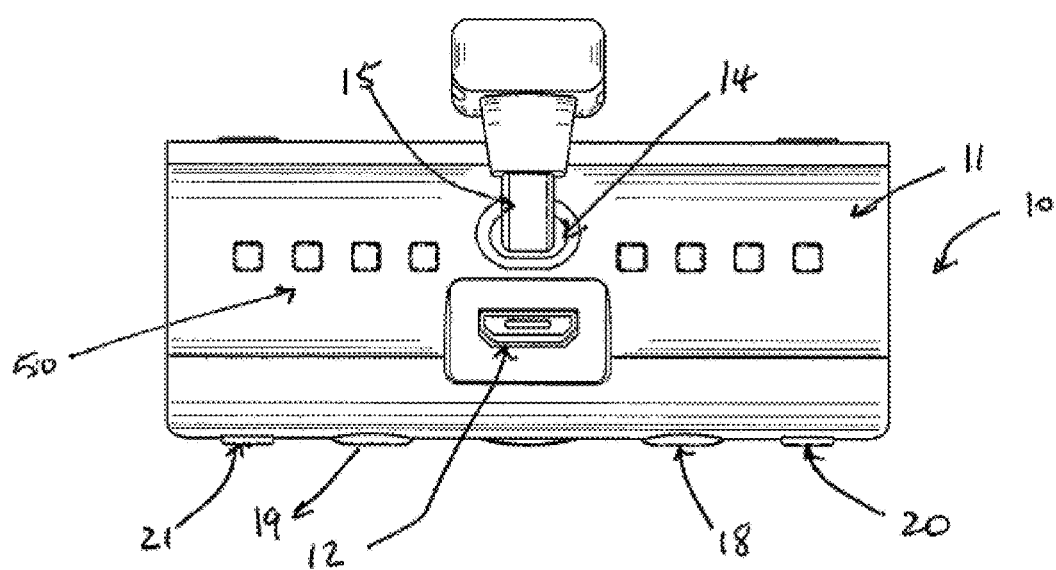
FIG. 4 is a front view of the adapter of FIG. 3.

In one embodiment, the at least one game actuator mechanism comprises at least one, and preferably two, levers (18, 19). As shown in FIG. 3, both levers extend from the adapter housing such that they extend along the underside of the controller when the adapter is installed into the controller. The physical actuation of the lever is contained within the adapter itself, so that no modification of the controller is required. In one embodiment, pressing the lever (18, 19) activates a contact switch (22) disposed on the adapter underneath the lever. If there are two levers, the adapter may comprise two control functions.

Figure 5:
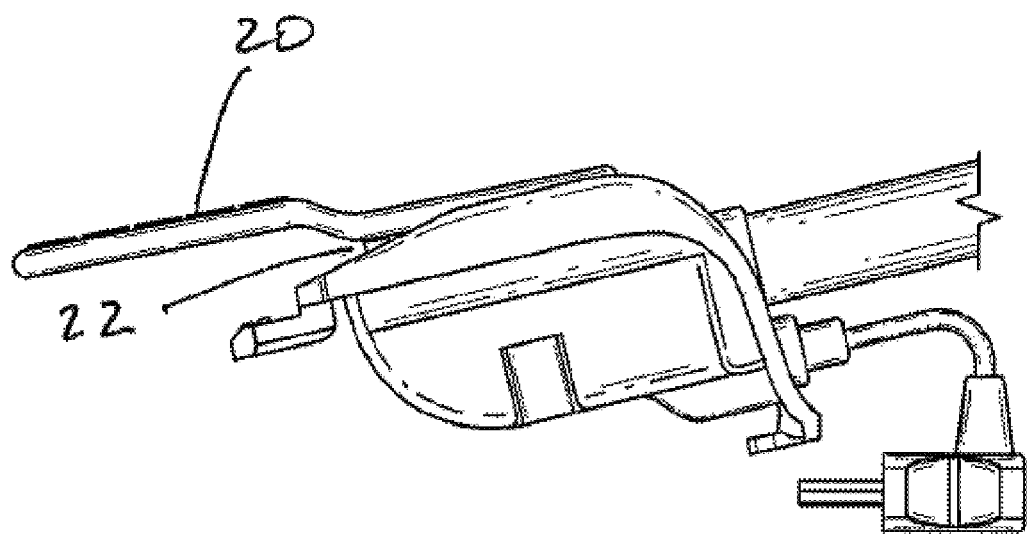
FIG. 5 is a side view of the adapter of FIG. 3.

The levers (18, 19) themselves may take any shape or configuration. For example, in one embodiment, the levers are straight and have a relatively broad surface for contact by the user's finger. The contact surface may be textured to help prevent slippage. In an alternative embodiment, the lever may have a slight curve or double bend, as shown in FIG. 5, so as to increase its separation from the controller (30) body when the adapter (10) is installed.

Figure 6:
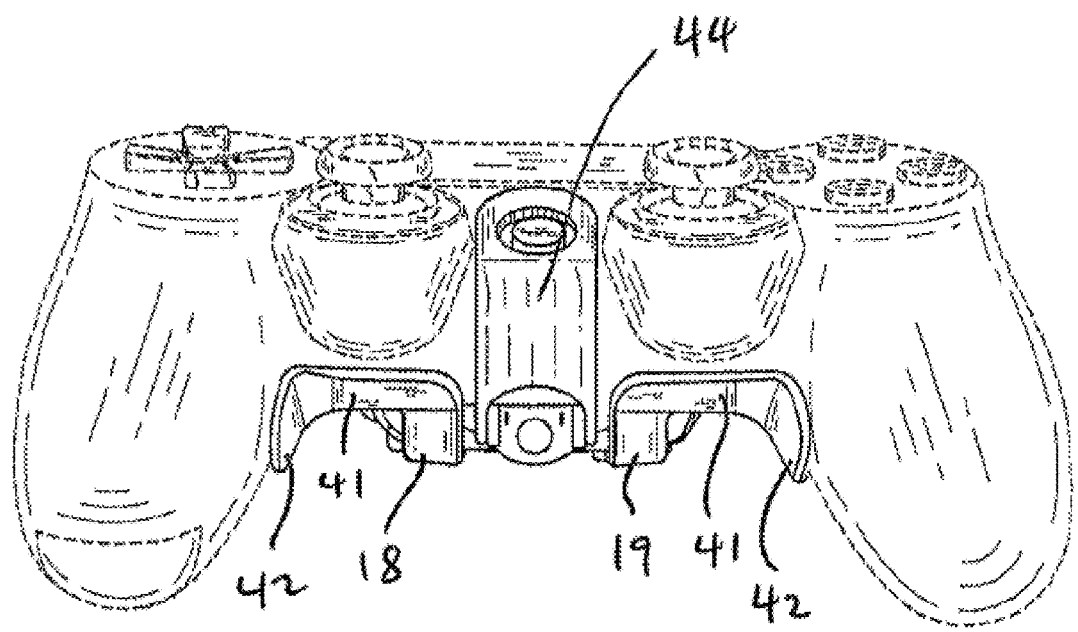
FIG. 6 is a front view of a different, alternative adapter, shown installed on a PlayStation® video game controller in dashed lines.
Figure 7:
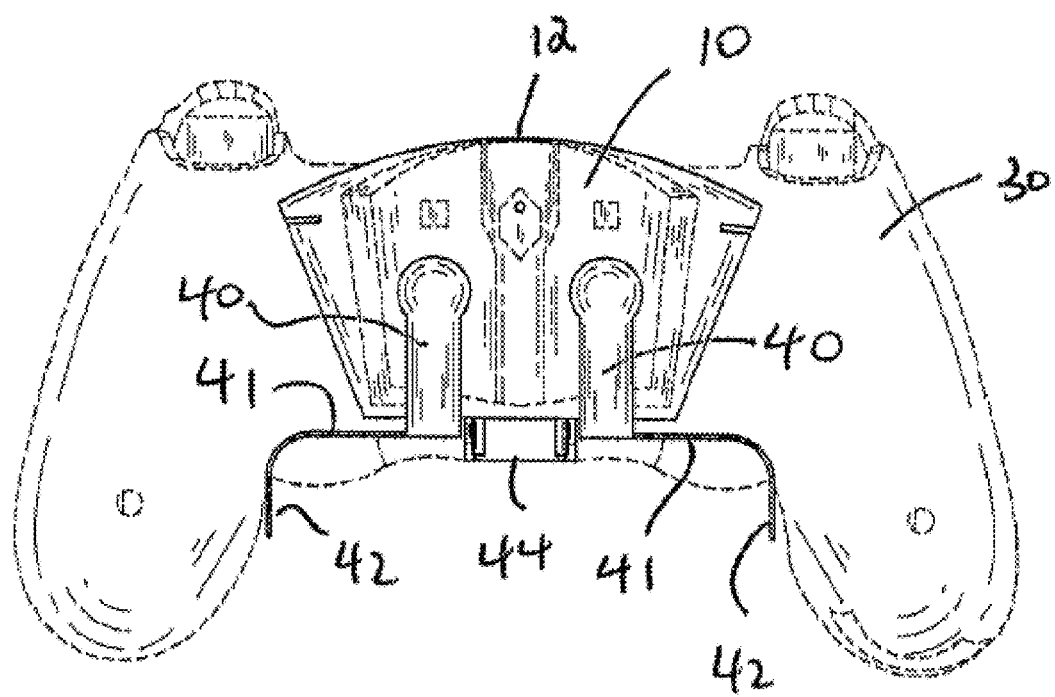
FIG. 7 is a bottom view of the adapter of FIG. 6.
Figure 8:
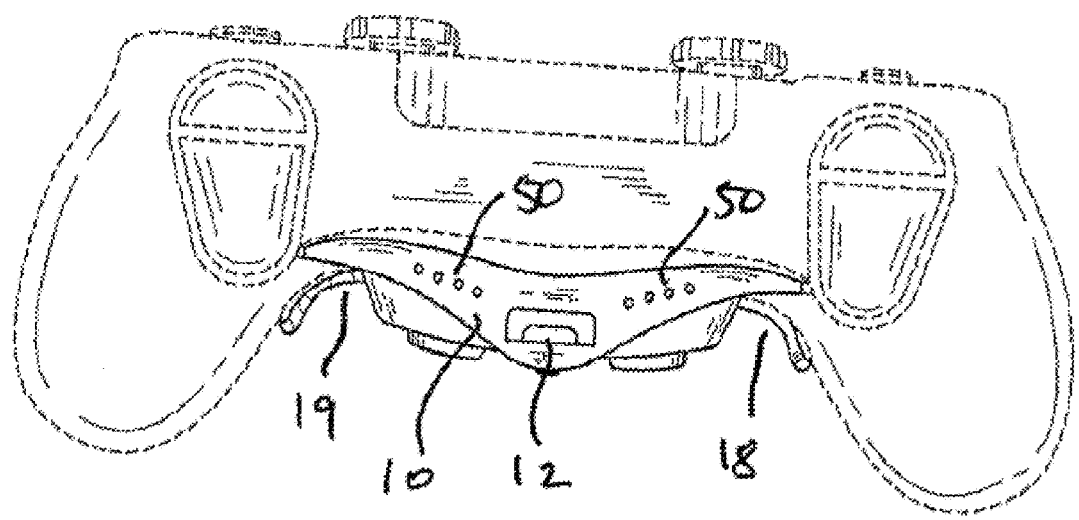
FIG. 8 is a rear view of the adapter of FIGS. 6 and 7.

In an alternative embodiment, the adapter may be configured to attach to a controller, which may or may not have an accessible battery compartment, such as a Playstation™ (PS3 or PS4) controller (30) is shown in FIGS. 6, 7 and 8. Connections to the controller and game console may be as described above, and the adapter functionality may be similar or identical.

As shown in FIGS. 6-8, in one embodiment, the levers (18, 19) may be adapted to the particular shape of a PS4 controller. In one embodiment, each lever comprises a first elongate section (40) which extends backwards substantially horizontally, a transverse section (41) where the lever extends outwardly and with a vertical planar orientation, and a tip section (42) where the lever extends rearwardly again but with a vertical planar orientation, as opposed to the horizontal planar orientation of the first elongate section (40).

The adapter is retained in position at the rear end by clip (44) which extends around the controller. The front end may be retained in position by insertion of a USB plug into the controller USB port (not shown), which provides the port for connection to the controller.

The adapter comprises a function control module (16) which is configured to replicate an existing or conventional game function when a lever (18 or 19) is activated. Therefore, two game control functions which are conventionally activated by a thumb or index finger control may be replicated to the levers on the underside of the controller. Alternatively, the control module (16) may be configured such that lever activation causes a custom game function or combination of functions to be sent to the game console.

In one embodiment, the functional control module (16) is configured to allow programming of the lever functions with the adapter (10) itself. A simple programming procedure may be used, such as the use of programming buttons (20, 21) which activates the programming function. In one procedure, the user depresses and holds the left or right programming button (20 or 21) while selecting the game controller button which function is to be assigned to the left or right lever, as the case may be. Upon release, that game function will have been assigned to that lever. Any conventional game function may be assigned to the lever in this manner. Alternatively, the function control module may be programmed such that the lever actuated function causes a combination of game functions to be sent to the controller, essentially simultaneously.

In another embodiment, the function control module (16) is programmable such that the lever actuated function may be selected from a plurality of different pre-programmed functions, or combination of functions, at the player's choice. The pre-programmed functions may be stored in a memory in the adapter and selected using a selection procedure utilizing the programming buttons (20, 21) and the lever switches (18, 19).

Alternatively, the adapter may be operatively connected, for example by USB connection, to a personal computer (not shown) which may operate a software program to select, upload or otherwise configure programmed selections in the adapter (10).

A bank of indicator lights (50) may be provided which visually indicate which programming option has been selected. For example, the game function of each of the left and right levers may each be chosen from eight different pre-programmed combination of game functions. A bank of eight indicator lights will visually show which program has been selected and is operative.

The game functions may be conventional game functions which are available with the unmodified game controller, or may be modified game functions developed and used by skilled game players at high levels.

Figure 9A:
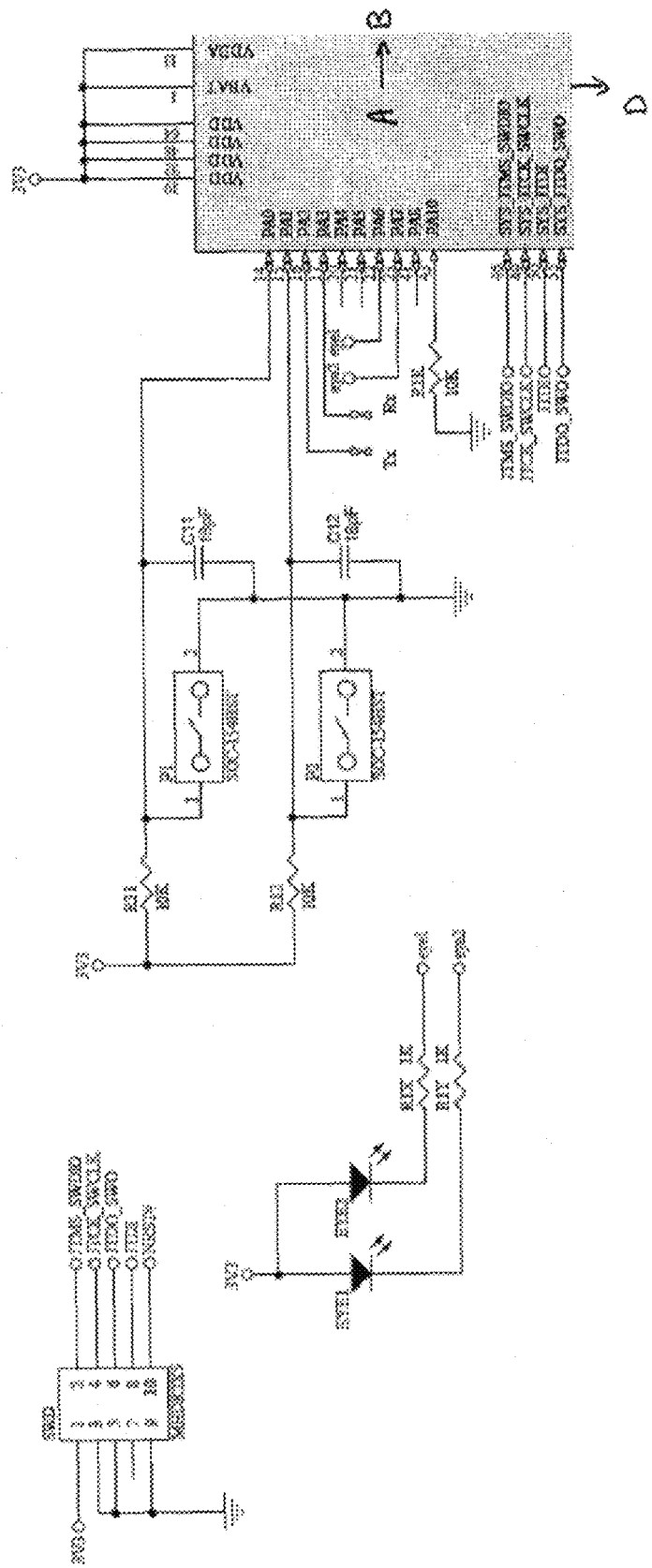
Figure 9B:
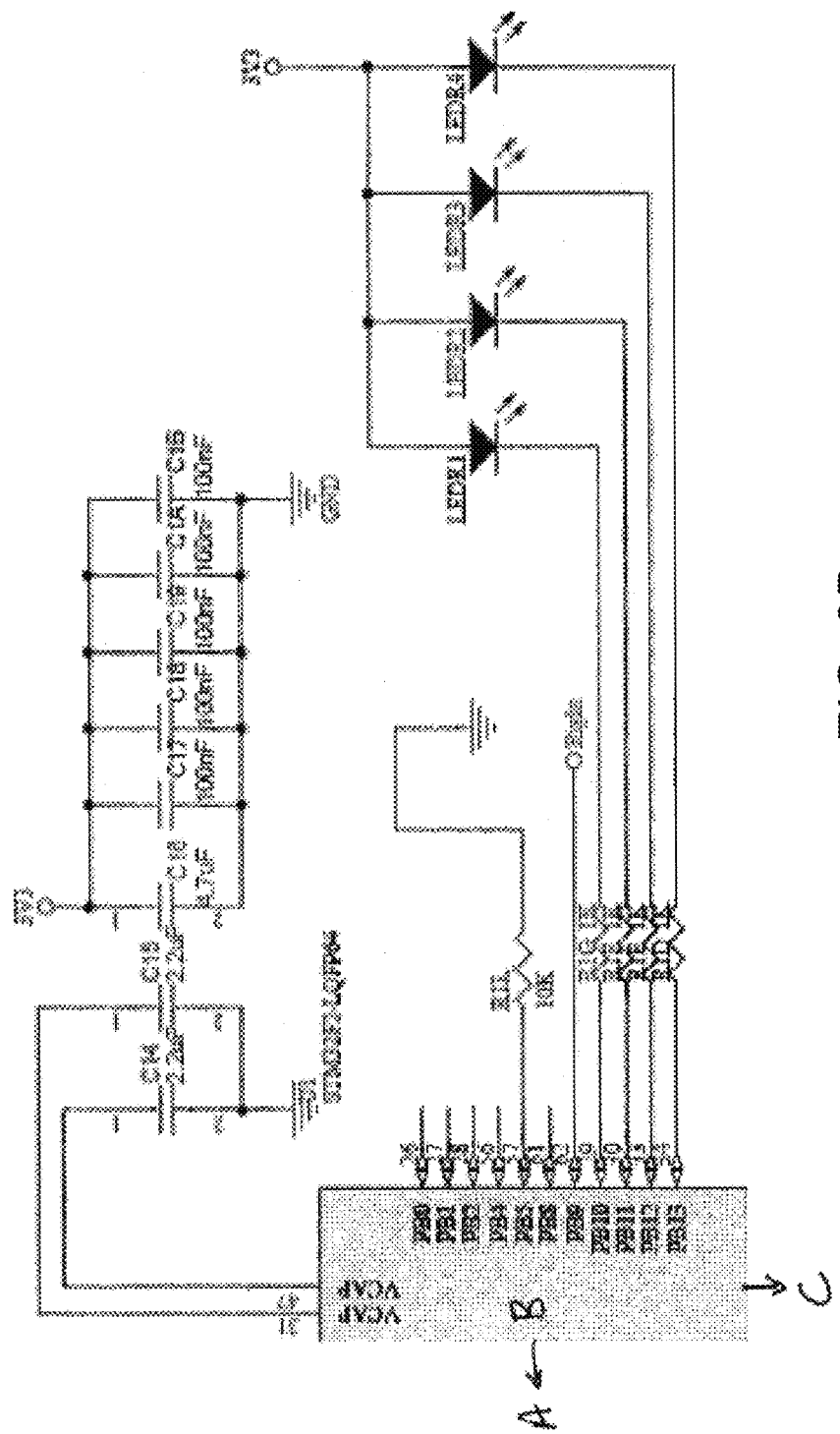
Figure 9D:
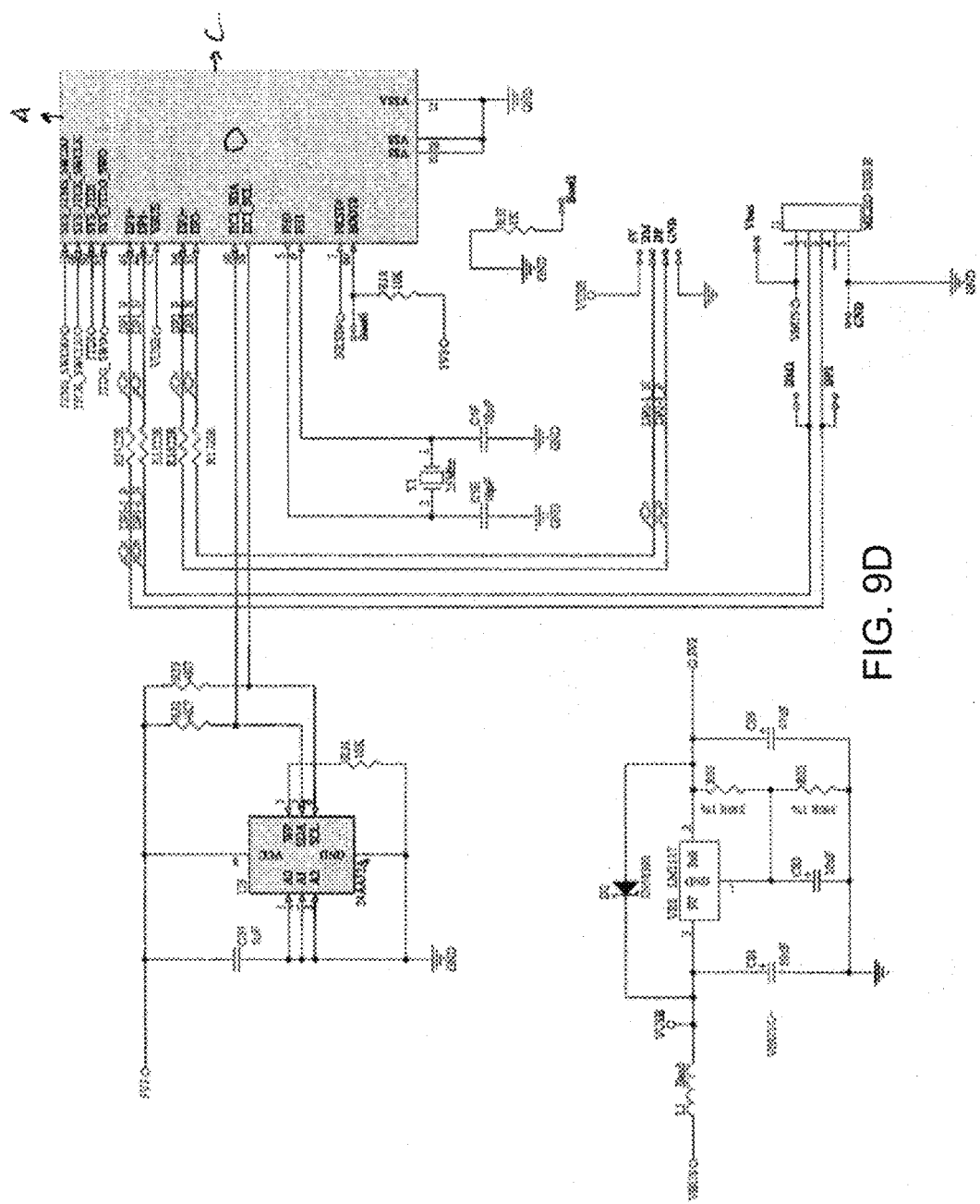

One exemplary implementation of a game function module (16) is shown in FIGS. 9A, B, C and D, using electronic terminology and symbols well known to those of skill in the art, which is intended to illustrate a specific embodiment of the present invention, and not be limiting of the claimed invention, unless specifically recited as a claim limitation.

Figure 10A:
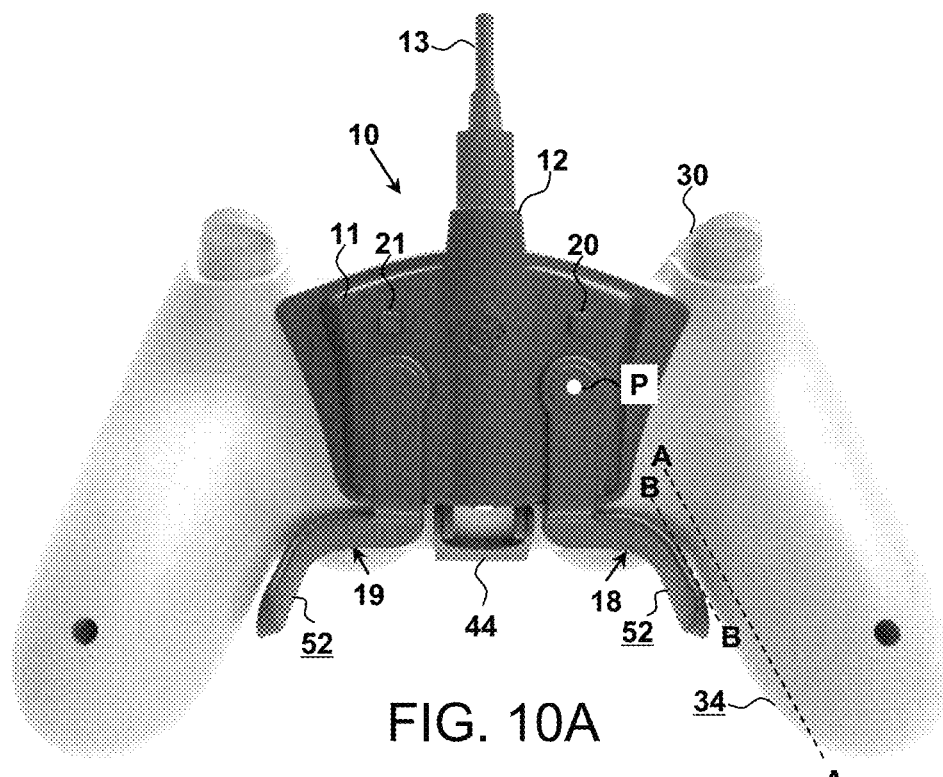
FIG. 10A shows a bottom view of a different embodiment of an adapter of the present invention, installed on a PlayStation® video game controller.
Figure 14:
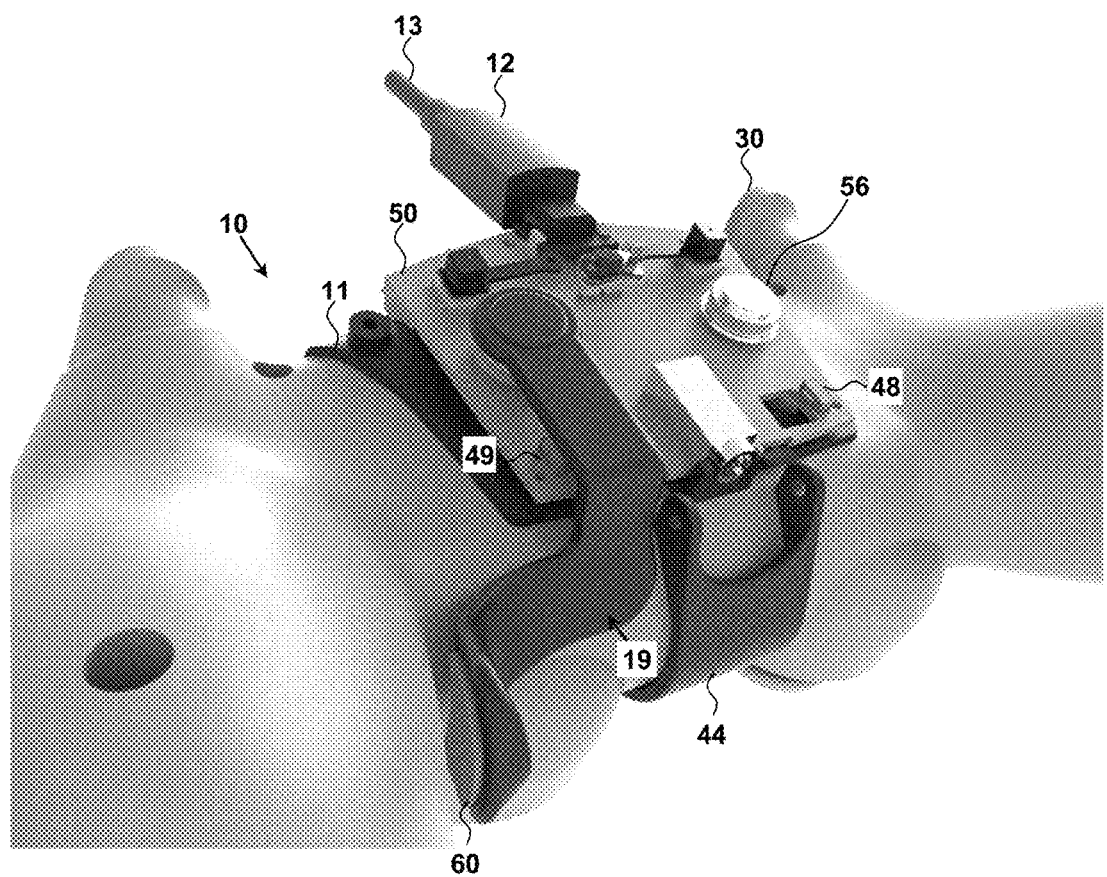
FIG. 14 show a bottom-rear perspective view of the adapter of FIG. 10A, when secured to the controller, with a bottom portion of the housing removed, and one of the levers removed to show the internal components of the adapter.

FIGS. 10A to 14 show views of another embodiment of an adapter (10) or components thereof. In FIGS. 10A, 10B, and 14, the adapter (10) is shown in use with a controller (30) for a Playstation™ (PS3 or PS4), but it will be understood that the invention is not limited by a particular type of controller. The embodiment of the adapter (10) is similar to the embodiment shown in FIGS. 6-8, with some of the differences now described.

In the embodiment of FIG. 10A, the adapter (10) has two game actuator mechanisms in the form of a left lever switch mechanism, and a right lever switch mechanism. Each of the lever switch mechanisms includes a contact switch (48, 49) (as shown in FIG. 14) and a lever (18, 19).

In an embodiment, the contact switch (48, 49) is attached, either directly or indirectly, to the housing (11). As used herein, "contact switch" refers to any device having a pair of contacts that are moveable relative to each other to actuate the contact switch between an open state wherein the contacts are separated from each other to prevent transmission of electronic signals via the contacts, and a closed state wherein the contacts engage each other to permit transmission of electronic signals via the contacts.

In the embodiment shown in FIG. 14, for example, the contact switch (48, 49) is attached to a printed circuit board (50), which is contained inside the housing (11) and attached to an upper portion of the housing (11). The embodiment of the contact switch (48, 49) is what is commonly known in the art as a push button "micro switch". Such micro switches typically have a plastic housing with a maximum external dimension of a few millimeters. The housing of the micro switch contains the contacts, and a spring that biases the contacts toward a normally open state. A small push button projects externally form the housing (11), and may be depressed to actuate movement of the contacts towards to the closed state. (In other embodiments, the spring may bias the contacts towards a normally closed state, and the push button may actuate the contacts to the open state when the push button is depressed.) In the embodiment shown in FIG. 14, the micro switch of the left and right lever switch mechanism are actuated by depressing the push button of the micro switch towards the left and right, respectively.

Each of the levers (18, 19) has a finger-engaging surface (52) disposed outside of the housing (11), and an actuator portion (54). The finger-engaging surface (52) is the surface of the lever (18, 19) to which the user applies a manual force during the ordinary use of the lever (18, 19) to activate a game function. The actuator portion (54) is the portion of the lever that engages the contact switch (48, 49) to actuate the contact switch (48, 49) from the open state to the closed state, or vice versa, in order to activate a game function. In the embodiment shown in FIG. 11, the actuator portion (54) of the lever (18, 19) is formed by a small tab that projects upwardly from the first elongate section (40) of the lever (18, 19), and through an aperture (55) defined by the housing (11).

In the embodiment shown in FIG. 10A, the lever (18) of the left lever switch mechanism pivots about a substantially vertical axis passing through pivot point (P). In the absence of any manual pressing force applied to the finger-engaging surface (52), the lever (18) is normally in a resting position (FIG. 10A). When a manual pressing force is applied to the finger-engaging surface (52), the lever pivots counter-clockwise (in the perspective of FIG. 10B) by an angular displacement, α, of about a couple of degrees, to an active position (FIG. 10B), whereupon the actuator portion (54) has moved to the right to actuate the contact switch (48) from the open state to the closed state. When the manual pressing force is released, the push button of the normally open micro switch urges the lever (18) to pivot in the clockwise angular direction, and thus return to the resting position (FIG. 10A). The interaction between lever (19) and contact switch (49) is analogous to the above described interaction between lever (18) and contact switch (48), except that the right lever switch (19) pivots in a clockwise direction (in the perspective of FIG. 10B) from its resting position to its active position to actuate the contact switch (49) from the open state to the closed state, and pivots in the counter-clockwise direction when returning to its resting position.

In the embodiment shown in FIG. 10A, when the housing (11) is fixed in relation to the controller (30), the finger-engaging surface (52) is oriented vertically, and extends rearward of the housing (11). The rearward direction is towards the body of the user. Moreover, the finger-contacting surface (34) of the hand grip and the finger-engaging surface (52) of the adapter (10) extend substantially parallel to each other in their elongate directions as shown in FIG. 10A by line A-A for the hand grip, and by line B-B for the lever. The finger-contacting surface (34) of the hand grip is disposed immediately adjacent to the finger-engaging surface (52) of the lever (18, 19), with a small separation therebetween (e.g., about 2 mm) so that the lever (18, 19) can be accessed without substantially changing the ergonomics of the controller (30).

The lever (18, 19) may be attached (directly or indirectly) to the housing (11) for pivoting movement relative the housing (11) in a variety of ways. In an embodiment (not shown), for example, the lever (18, 19) may define an aperture that loosely receives a pin that is secured to the housing (11) such that the lever (18, 19) pivots around the pin. In the embodiment as shown in FIGS. 11 to 14, a permanent magnet (56) is attached to the printed circuit board, which is disposed inside the housing (11) and attached to an upper portion of the housing (11). A ferromagnetic member (58) (e.g., a member made of ferritic stainless steel) is attached to the lever (18, 19). The housing (11) defines an aperture (61) through which the ferromagnetic member (58) passes to make contact with the permanent magnet (56). Magnetic attraction between the permanent magnet (56) and the ferromagnetic member (58) removably attaches the lever (18, 19) to the housing (11). The use of the permanent magnet (56) and ferromagnetic member (58) to attach the lever (18, 19) to the housing (11) allows the lever (18, 19) to be conveniently removed from the rest of the adapter (10) without the need for any tools. These facilitates the replacement of levers (18, 19) that may have become damaged with new levers, or with customized levers.

In the embodiment show in FIGS. 11 to 14, the permanent magnet (56) is in the shape of a cylindrical disc, while the ferromagnetic member (58) defines a cylindrical recess (59). The cylindrical recess (59) is sized to receive the disc-shaped permanent magnet (56) within a close tolerance. Accordingly, the cylindrical recess (59) permits relative rotation of the disc-shaped permanent magnet (56) relative to the ferromagnetic member (58) when the lever (18, 19) pivots relative to the housing (11). At the same time, contact between the vertical walls of the ferromagnetic member (58) defining the cylindrical recess (59), and the vertical walls of the permanent magnet (56) limit translational movement of the lever (18, 19) relative to housing (11). In comparison with a pin-type connection, this avoids the need to form any apertures in the lever (18, 19), or expose the lever (18, 19) itself to repeated friction with the pin. In other embodiments (not shown), the permanent magnet (56) may instead be attached to the lever (18, 19), and the ferromagnetic member (58) may instead be attached to the housing (11). In other embodiments (not shown), the permanent magnet (56) may instead define the cylindrical recess (59), and the ferromagnetic member (58) may instead define the cylindrical disc.

Figure 10B:
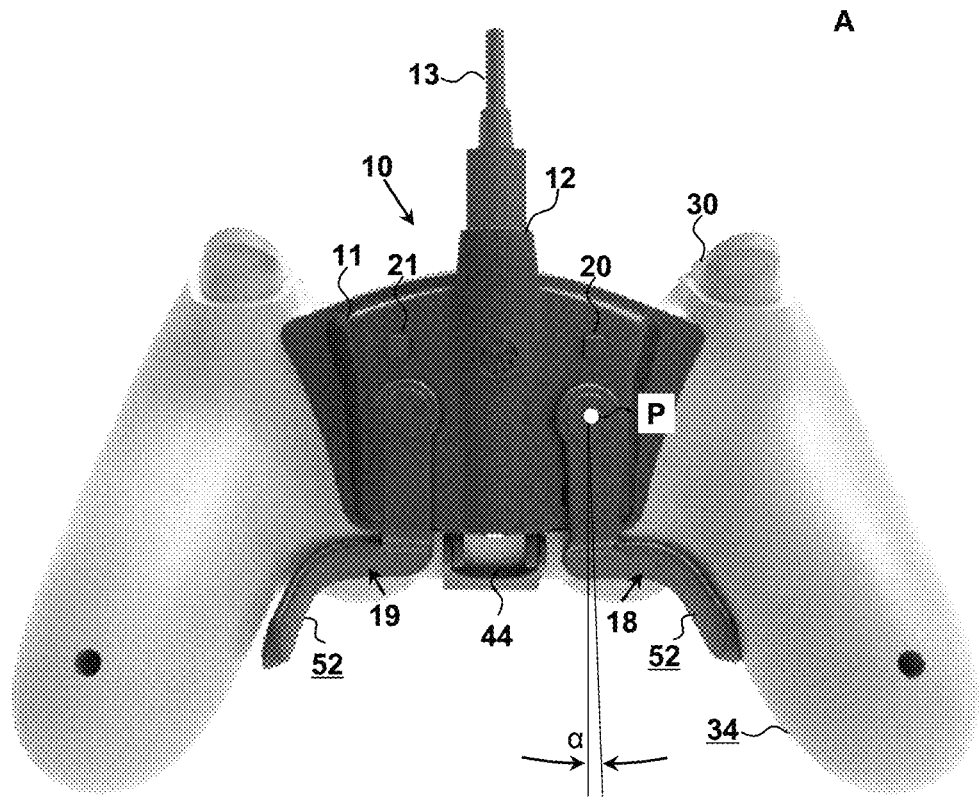
FIG. 10B shows a bottom view of the adapter of FIG. 10B, with one of the levers in a resting position, and another one of the levers in an activated position.

The adapter (10) may be subjected to vigorous use during gameplay, and considerable manual force may be applied to the finger-engaging surface (52) of the lever (18, 19). This induces stress in the lever (18, 19), particularly near the tab forming the actuator portion (54) of the lever (18, 19), and near the portion of the lever (18, 19) that transitions from the transverse section (41) to the tip section (42) (see FIG. 11). To alleviate this problem, in an embodiment, the lever (18, 19) is allowed to pivot into bearing relationship with the controller (30) when the lever (18, 19) is pivoted into the active position, as shown in FIG. 10B. Moreover, as shown in FIG. 13, a resilient pad (60) (e.g., a pad made of foam rubber) is attached to the portion of the lever (18, 19) that comes into bearing relationship with the controller (30). The resilient pad (60) is compressed between the lever (18, 19) and the lever (18, 19), as the lever (18, 19) pivots relative to the housing (11) into the active position. The resilient pad (60) helps to prevent damage to both the lever (18, 19) and the controller (30), reduces noise created by the lever (18, 19) contacting the controller (30), and dampens the impact between the lever (18, 19) and the controller (30) to provide a more enjoyable tactile experience for the user.

Definitions and Interpretation

The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. Embodiments were chosen and described in order to best explain the principles of the invention and the practical application, and to enable others of ordinary skill in the art to understand the invention for various embodiments with various modifications as are suited to the particular use contemplated.

The corresponding structures, materials, acts, and equivalents of all means or steps plus function elements in the claims appended to this specification are intended to include any structure, material, or act for performing the function in combination with other claimed elements as specifically claimed.

References in the specification to "one embodiment", "an embodiment", etc., indicate that the embodiment described may include a particular aspect, feature, structure, or characteristic, but not every embodiment necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such aspect, feature, structure, or characteristic with other embodiments, whether or not explicitly described. In other words, any element or feature may be combined with any other element or feature in different embodiments, unless there is an obvious or inherent incompatibility between the two, or it is specifically excluded.

It is further noted that the claims may be drafted to exclude any optional element. As such, this statement is intended to serve as antecedent basis for the use of exclusive terminology, such as "solely," "only," and the like, in connection with the recitation of claim elements or use of a "negative" limitation. The terms "preferably," "preferred," "prefer," "optionally," "may," and similar terms are used to indicate that an item, condition or step being referred to is an optional (not required) feature of the invention.

The singular forms "a," "an," and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. An adapter for use with a video game controller of a video game console, the adapter comprising:
    (a) a housing for attachment to the controller;
    (b) at least one lever switch mechanism comprising:
        (i) a contact switch actuable between an open state and a closed state;
        (ii) a lever comprising a finger-engaging surface and an actuator portion, wherein the lever is pivotable relative to the housing in response to a manual force applied to the finger-engaging surface, whereupon the actuator portion moves to actuate the contact switch between the open state and the closed state; and
    (c) a console port operatively connected to the contact switch, and adapted to communicate electronic signals controlled by the contact switch to the game console to actuate a game function.

2. The adapter of claim 1, wherein the at least one lever switch mechanism comprises a left lever switch mechanism, and a right lever switch mechanism.

3. The adapter of claim 2, further comprising:
    (a) a left programming button and a right programming button;
    (b) a controller port adapted to interface with the controller to receive a game function from the controller; and
    (c) a function control module operatively connected to the left programming button, the right programming button, and the controller port, wherein the function control module is configured to be programmable to assign the game function to either:
        (i) the left lever switch, in response to receiving an input created by depressing the left programming button when the game function is received from the controller; or
        (ii) the right lever switch, in response to receiving an input created by depressing the right programming button when the game function is received from the controller.

4. The adapter of claim 1, wherein the lever comprises a first elongate section that extends rearwards substantially horizontally with a horizontal planar orientation, a transverse section that extends outwardly from a rear end of the first elongate section with a vertical planar orientation, and a tip section comprising the finger-engaging surface of the lever that extends rearward again from the transverse section with a vertical planar orientation.

5. The adapter of claim 1, wherein the finger-engaging surface of the lever is oriented vertically, when the housing is attached to the controller.

6. The adapter of claim 1, wherein the controller comprises a hand grip comprising a finger-contacting surface, wherein the finger-engaging surface of the lever is disposed immediately adjacent the finger-contacting surface of the hand grip, when the housing is attached to the controller.

7. The adapter of claim 6, wherein the finger-engaging surface of the lever and the finger-contacting surface of the hand grip extend substantially parallel to each other, when the housing is attached to the controller.

8. The adapter of claim 1, wherein the contact switch is biased toward a normal state being either the open state or the closed state.

9. The adapter of claim 1, wherein:
(a) the contact switch is disposed inside the housing; and
(b) the actuator portion of the lever passes from outside the housing to inside the housing via an aperture defined by the housing, to engage the contact switch.

10. The adapter of claim 1, further comprising:
(a) a first ferromagnetic member attached to the housing; and
(b) a second ferromagnetic member attached to the lever;
wherein at least one of the first and second ferromagnetic members comprises a permanent magnet, and wherein the lever is removably attached to the housing by magnetic attraction between the first and second ferromagnetic members.

11. The adapter of claim 10, wherein:
(a) either one of the first and second ferromagnetic members defines a cylindrical disc; and
(b) the other one of the first and second ferromagnetic members defines a cylindrical recess;
wherein the recess is sized to receive the disc in an axial direction and permit rotation of the disc relative to the recess when the lever pivots relative to the housing, while circumscribing the disc to prevent radial translation of the disc relative to the recess.

12. The adapter of claim 10 wherein:
(a) the first ferromagnetic member is disposed inside the housing; and
(b) the second ferromagnetic member passes from outside the housing to inside the housing via an aperture defined by the housing, to contact the first ferromagnetic member.

13. The adapter of claim 1, wherein the lever switch mechanism further comprises a resilient pad attached to the lever, wherein the pad is positioned on the lever so as to be compressed between the lever and the controller when the housing is attached to the controller and the lever pivots relative to the housing.

14. The adapter of claim 1, wherein the lever pivots relative to the housing about a substantially vertical axis, when the housing is attached to the controller.

15. The device of claim 14, wherein the lever extends along an underside of the controller, when the housing is attached to the controller.

16. A device for use with a video game controller adapter comprising a housing for attachment to the game controller, a contact switch actuable between an open state and a closed state, and a first ferromagnetic member attached to the housing, wherein the device comprises:
(a) a lever comprising a finger-engaging surface and an actuator portion, wherein the actuator portion is positioned to move and thereby actuate the contact switch between the open state and the closed state, when the lever is attached to the housing and pivoted relative to the housing in response to a manual force applied to the finger-engaging surface; and
(b) a second ferromagnetic member attached to the lever, wherein at least one of the first and second ferromagnetic members comprises a permanent magnet, and wherein the lever is removably attachable to the housing by magnetic attraction between the first and second ferromagnetic members, wherein:
  (i) either one of the first and second ferromagnetic members defines a cylindrical disc; and
  (ii) the other one of the first and second ferromagnetic members defines a cylindrical recess sized to receive the disc in an axial direction and permit rotation of the disc relative to the recess when the lever pivots relative to the housing, while circumscribing the disc to prevent radial translation of the disc relative to the recess.

17. The device of claim 16, wherein the finger-engaging surface of the lever is oriented vertically, when the lever is attached to the housing, and the housing is attached to the controller.

18. The device of claim 16, further comprising a resilient pad attached to the lever, wherein the pad is positioned on the lever so as to be compressed between the lever and the controller when the housing is attached to the controller, the lever is attached to the housing, and the lever pivots relative to the housing.

19. The device of claim 16, wherein the lever pivots relative to the housing about a substantially vertical axis, when the lever is attached to the housing, and the housing is attached to the controller.

20. The device of claim 19, wherein the lever extends along an underside of the controller, when the lever is attached to the housing, and the housing is attached to the controller.

21. A device for use with a video game controller adapter comprising a housing for attachment to the game controller, a contact switch actuable between an open state and a closed state, the device comprising a lever comprising a finger-engaging surface and an actuator portion, wherein the actuator portion is positioned to move and thereby actuate the contact switch between the open state and the closed state, when the lever is attached to the housing and pivoted relative to the housing in response to a manual force applied to the finger-engaging surface, and wherein the lever comprises a first elongate section that extends rearwards substantially horizontally with a horizontal planar orientation, a transverse section that extends outwardly from a rear end of the first elongate section with a vertical planar orientation, and a tip section comprising the finger-engaging surface of the lever that extends rearward again from the transverse section with a vertical planar orientation, when the lever is attached to the housing, and the housing is attached to the controller.

22. The device of claim 21, wherein the lever pivots relative to the housing about a substantially vertical axis, when the lever is attached to the housing, and the housing is attached to the controller.

23. The device of claim 22, wherein the lever extends along an underside of the controller, when the lever is attached to the housing, and the housing is attached to the controller.

* * * * *